(12) United States Patent
Kipe et al.

(10) Patent No.: US 8,641,943 B1
(45) Date of Patent: Feb. 4, 2014

(54) APPARATUS AND METHOD FOR FILLING A MOLD WITH A LIQUID MATERIAL

(75) Inventors: George Kipe, Yorba Linda, CA (US); Kaspar Wirth, Tualatin, OR (US)

(73) Assignee: Kipe Molds, Inc., Placentia, CA (US)

( * ) Notice: Subject to any disclaimer, the term of this patent is extended or adjusted under 35 U.S.C. 154(b) by 0 days.

(21) Appl. No.: 13/480,087

(22) Filed: May 24, 2012

(51) Int. Cl.
*B29C 45/76* (2006.01)

(52) U.S. Cl.
USPC ....... 264/40.5; 264/328.8; 425/145; 425/146; 425/572; 425/573

(58) Field of Classification Search
USPC ............... 264/40.1, 40.5, 40.7, 328.1, 328.8; 425/145, 149, 572, 573, 146
See application file for complete search history.

(56) References Cited

U.S. PATENT DOCUMENTS

| | | | | |
|---|---|---|---|---|
| 3,535,742 A | * | 10/1970 | Marcus | 425/146 |
| 5,087,190 A | * | 2/1992 | Laghi | 425/145 |
| 5,556,582 A | * | 9/1996 | Kazmer | 264/40.1 |
| 5,762,855 A | * | 6/1998 | Betters et al. | 264/328.8 |
| 5,919,492 A | * | 7/1999 | Tarr et al. | 425/144 |
| 6,767,486 B2 | * | 7/2004 | Doughty et al. | 264/40.1 |
| 2005/0046061 A1 | * | 3/2005 | Nagaoka et al. | 264/40.1 |
| 2010/0183763 A1 | * | 7/2010 | Babin et al. | 425/549 |

* cited by examiner

*Primary Examiner* — Jill Heitbrink
(74) *Attorney, Agent, or Firm* — Oblon, Spivak, McClelland, Maier & Neustadt, L.L.P.

(57) ABSTRACT

A method for filling a mold with a compressible liquid material is disclosed. The mold is connected to a manifold via a plurality of runners, with at least one valve disposed in at least one of the plurality of runners. A controller is configured to pressurize the manifold with the liquid material, and modulate the at least one valve to perform a plurality of pulse cycles during one filling cycle of the mold. A pulse cycle includes adjusting an aperture of the valve from a first position to a second position, and adjusting the aperture of the valve from the second position to a third position, where the aperture corresponding to the second position is larger than the aperture corresponding to the first position, and the aperture corresponding to the third position is smaller than the aperture corresponding to the second position.

28 Claims, 12 Drawing Sheets

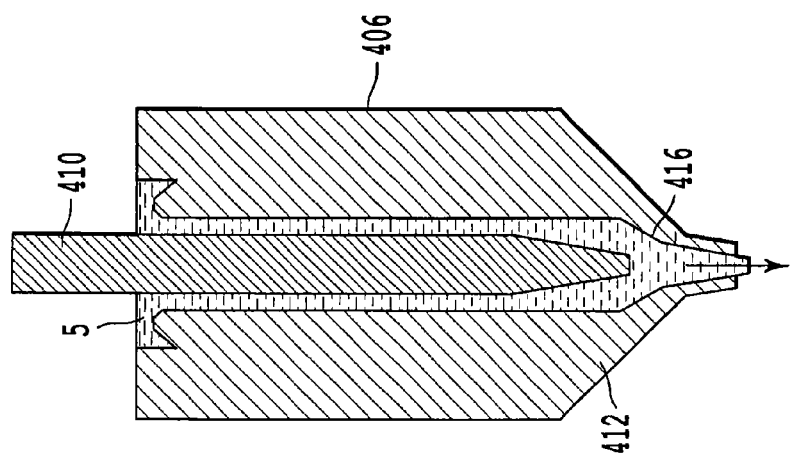
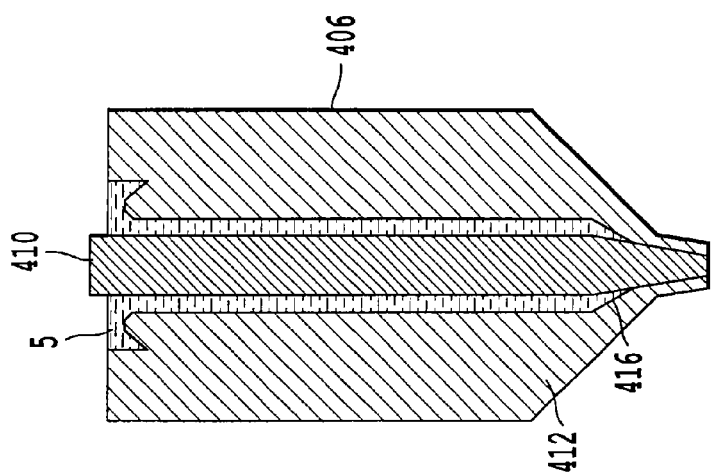

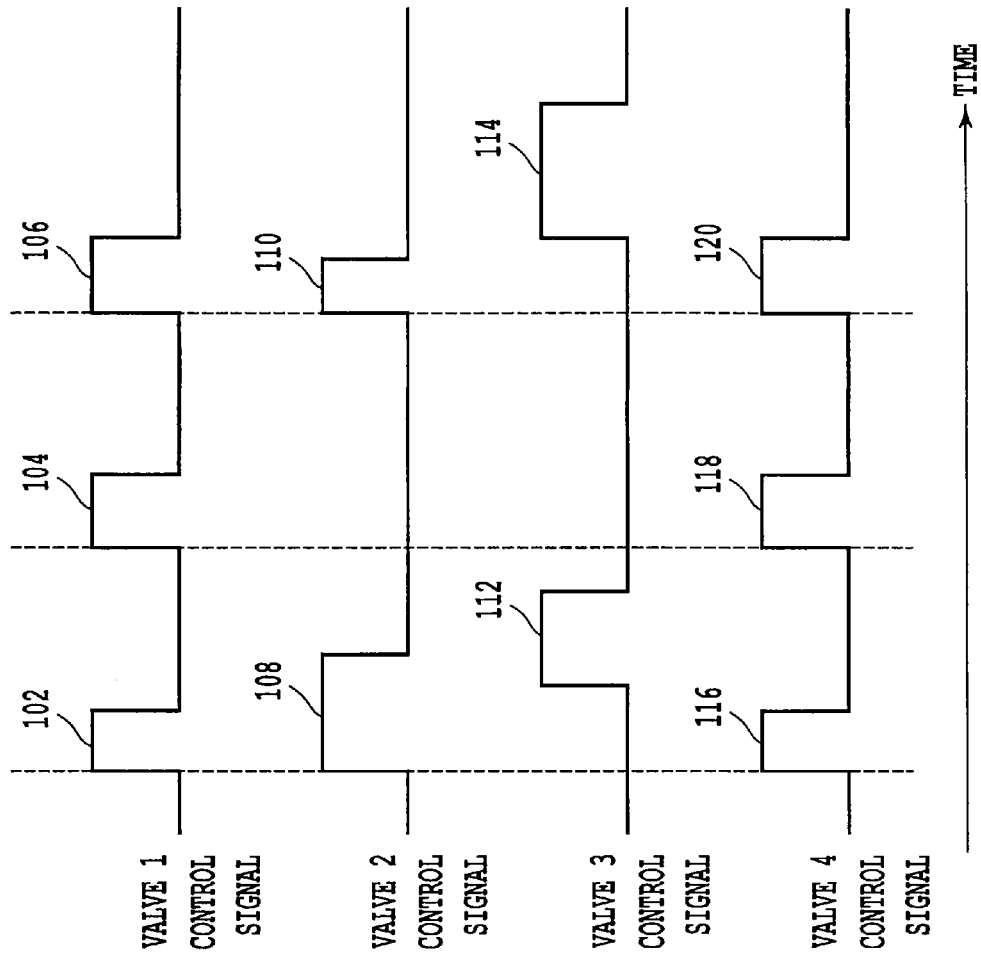

APPARATUS AND METHOD FOR FILLING A MOLD WITH A LIQUID MATERIAL

BACKGROUND OF THE INVENTION

1. Field of the Invention

The present invention relates to apparatus, software, and methods for filling a mold with a liquid material. More particularly, the present invention relates to apparatus, software, and methods for filling a mold with a liquid material by pulsing the liquid material flow.

2. Description of the Related Art

Injection molding is a method for manufacturing parts using a material that is a liquid in an uncured state, and that may be transformed into a solid by a curing or freezing process within a mold. Two broad classes of molding materials used in injection molding are thermal plastic materials and thermal set materials. Thermal set materials remain liquid at relatively low temperatures, and through application of heat over time (i.e., curing), the chemical composition of thermal set materials can be altered to yield a solid. Thermal plastic materials, on the other hand, are solid at relatively low temperatures, and must be melted before injection into a cool mold. Once cooled, thermal plastic materials re-solidify (i.e., freeze) with little or no alteration to the chemical composition of the material.

Sometimes it is advantageous to simultaneously fill multiple mold cavities with liquid material from a common manifold in a multi-port direct injection molding system. Such a system may benefit from uniformity of flow through the multiple ports to promote the quality of the parts so molded. As discussed above, the curing of thermal set materials and solidification of thermal plastic materials both depend upon heat transfer processes within the mold, and ideally, the molded material begins to cure or solidify once the mold is completely filled. Thus, the heat transfer between the molded material and the mold is ideally tailored to a particular mold filling rate.

However, a mold cavity filling at a rate slower than the corresponding designed heat transfer rate poses a risk that the mold material may begin to solidify before the mold is completely full. This condition of premature curing or solidification is referred to as a "short shot," and may result in defects in the molded product. In the alternative, a mold cavity filling at a faster rate than the corresponding designed heat transfer rate poses a risk that the mold material may begin to over-pressurize the mold cavity and overflow the cavity. This condition of overflowing the mold cavity is referred to as "flash," and may result in defects in the molded product. Thus, in a multi-port direct injection molding system, it is desirable to have identical mold cavities fill at identical rates, commensurate with the corresponding designed heat transfer rates, to promote molded part quality.

Some molding material properties pose challenges to flow uniformity in multi-port direct injection molding systems. These problematic material properties include compressibility and non-Newtonian behavior. The density of a compressible liquid is affected by changes in pressure. Thus, a mass of compressible liquid that fills a volume at one pressure may spill over from the volume at a lower pressure or fill less than the full volume at a higher pressure. Further, pressure does not transmit instantaneously through a compressible liquid. Rather, pressure inputs travel through a compressible liquid at a finite wave speed.

A liquid is non-Newtonian when its shear rate is not directly proportional to the shear stress applied. One non-Newtonian fluid characteristic exhibited by some molding materials is shear thinning behavior, where the apparent viscosity of the fluid decreases with increasing shear stress applied. Examples of molding materials that exhibit both compressibility and shear thinning behavior are liquid silicone rubber (LSR), which is a thermal set material, and thermal plastic elastomer (TPE), which is a thermal plastic material.

Shear thinning behavior can be problematic in multi-port, direct injection molding systems because differences in shear energy from flow of the silicone through different channels may cause differences in apparent viscosity among the different channels. In turn, the differences in apparent viscosity among different channels can cause undesirable non-uniformity in flow through the different channels. Further, these differences in apparent viscosity can amplify over time because the channels with the highest flow experience the most shear thinning, which may cause the fluid to flow even faster and cause even more non-uniformity among the mold cavity filling rates.

Control of flow balance among parallel channels in a multi-port system has been attempted by altering the set points of parallel runner heaters between the manifold and the mold cavities. This temperature control approach takes advantage of the physical relationship between the temperature of the molding material and its viscosity to counteract shear thinning behavior.

However, the temperature control method is disadvantageous because one must know the extent of the system flow non-uniformity a priori in order to choose the control heater set points. Further, the thermal capacitance of a multi-runner injection system can result in slow temperature response of the liquid material, thereby causing production delays. Moreover, the temperature control method is not considered applicable to thermal set materials because adding heat to the thermal set material upstream of the mold could cause undesirable material curing upstream of the mold or premature curing within a mold cavity.

Attempts have been made to mitigate flow imbalance in multi-port systems by tailoring the flow resistance of parallel channels. Many of these strategies employ some form of a mechanical choke to bias flow path restrictions in the manifold channels or nozzles. Simple systems employ manual chokes positioned within the manifold flow channels so as to tailor the flow restriction between the pressure source and each runner extending to one or more mold cavities. More advanced systems vary the opening stroke of different valves in order to counteract relative flow variations among different nozzles.

Valve gate control is another strategy for mitigating flow imbalance in multi-port systems. Valve gate control tailors the opening and/or closing times of valves in individual parallel channels according to fixed time schedules or based on a measured input such as a pump impeller position. For mold cavities that fill fastest, delays are added to the opening of the nozzles feeding those cavities.

However, the flow distribution control approaches involving mechanical chokes, differential valve throttling, and differential valve opening delays all suffer from a common disadvantage as differential temperature control, namely that the nature and degree of imbalance in the system must be characterized a priori in order to implement the control. Indeed, trial and error is required to implement correctly sized manual chokes in the correct locations, or to select the correct biases in valve opening positions, or to select the correct valve opening delays to improve the balance a multi-port direct injection molding system. Further, the flow resistance tailoring scheme that improves the balance for one machine paired with one mold may not balance the flows in another machine paired with the same mold or the same machine paired with different mold.

Moreover, attempted solutions that function by throttling the size of flow channels in the manifold or runners of a multi-port injection system create viscosity variation in each flow channel when the fluid has shear thinning characteristics. While flow balance may be improved, the liquid material flowing through the restricted flow paths may be heated as it is restricted, thereby introducing runner-to-runner thermal variations which can lead to undesirable pack characteristics in the molded parts. In addition, the valve gate control systems that delay valve openings for the faster flowing channels may introduce differences in fill times, which can affect shrinkage conditions and therefore part quality.

SUMMARY OF THE INVENTION

Accordingly, the need exists for improved fill balance control in multi-port direct injection molding systems to address the above-noted problems.

A method for filling a mold with a compressible liquid material, the mold connected to a manifold via a plurality of runners, at least one valve disposed in at least one of the plurality of runners, such that the at least one valve is in fluid communication with both the manifold and the mold, comprises: pressurizing the manifold with the compressible liquid material; and modulating the at least one valve to perform a first plurality of pulse cycles during one filling cycle of the mold, wherein a first pulse cycle of the first plurality of pulse cycles includes moving a throttling member of the at least one valve from a first position to a second position, and moving a throttling member of the at least one valve from the second position to a third position, a flow aperture area of the at least one valve corresponding to the second position is larger than the a flow aperture area of the at least one valve corresponding to the first position, and a flow aperture area of the at least one valve corresponding to the third position is smaller than the flow aperture area of the at least one valve corresponding to the second position.

An apparatus for filling a mold with a compressible liquid material, comprises: a manifold; a plurality of runners connecting the manifold to the mold; at least one valve disposed in at least one of the plurality of runners; and a controller configured to modulate the at least one valve over a first plurality of pulse cycles during one filling cycle of the mold, wherein a first pulse cycle of the first plurality of pulse cycles includes moving a throttling member of the at least one valve from a first position to a second position, and moving the throttling member of the at least one valve from the second position to a third position, the at least one valve is in fluid communication with both the manifold and the mold, a flow aperture area of the at least one valve corresponding to the second position is larger than a flow aperture area of the at least one valve corresponding to the first position, and the flow aperture area of the at least one valve corresponding to the third position is smaller than the flow aperture area of the at least one valve corresponding to the second position.

An article of manufacture comprises a non-transitory machine-readable medium having instructions encoded thereon for enabling a processor to fill a mold with a compressible liquid material by executing the operations of receiving at least one valve pulsing parameter defining a valve opening trigger, receiving at least one valve pulsing parameter defining a valve closing trigger, and modulating at least one valve to perform a plurality of pulse cycles during one filling cycle of the mold, wherein a first pulse cycle of the plurality of pulse cycles includes moving a throttling member of the at least one valve from a first position to a second position, and moving a throttling member of the at least one valve from the second position to a third position, a flow aperture area of the at least one valve corresponding to the second position is larger than a flow aperture area of the at least one valve corresponding to the first position, and a flow aperture area of the at least one valve corresponding to the third position is smaller than the flow aperture area of the at least one valve corresponding to the second position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4a shows an exemplary embodiment of a valve for injecting a compressible liquid material into a mold, where the valve is in a closed position.

FIG. 4b shows an exemplary embodiment of a valve for injecting a compressible liquid material into a mold, where the valve is in an open position.

FIG. 11b shows an exemplary embodiment of pulsing a valve in response to the liquid pressure measurement of FIG. 11a.

FIG. 18 shows an exemplary embodiment of valve pulsing control schedules for a plurality of valves in an apparatus for filling a mold with a compressible liquid material.

DETAILED DESCRIPTION OF THE PREFERRED EMBODIMENTS

Figure 1:
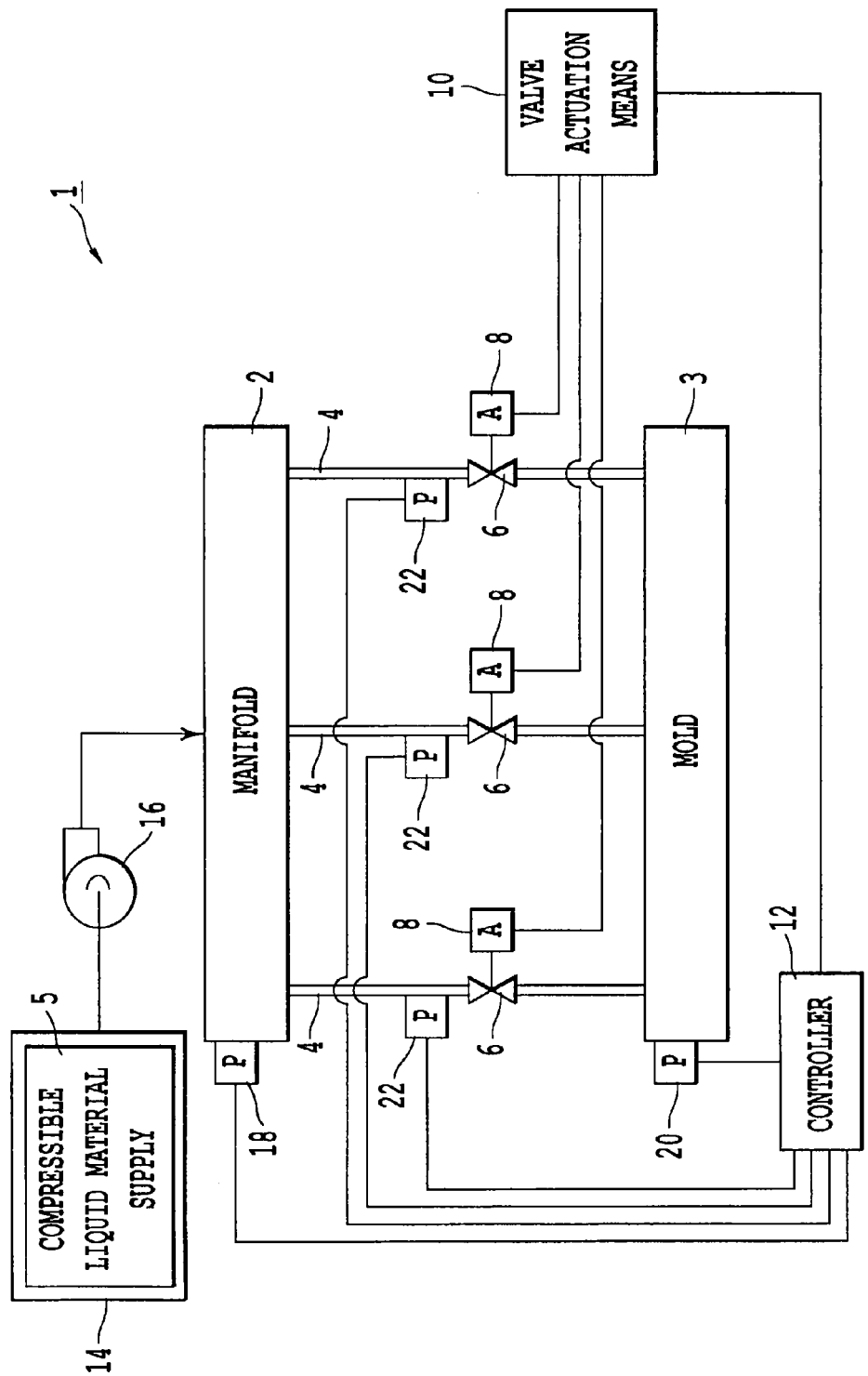
FIG. 1 shows an exemplary embodiment of an apparatus for filling a mold with a compressible liquid material.

Referring now to the drawings, wherein like reference numerals designate identical or corresponding parts throughout the several views.

FIG. 1 shows an exemplary embodiment of an apparatus 1 for filling a mold 3 with a compressible liquid material 5. The apparatus 1 includes a manifold 2 that may be in fluid communication with a mold 3 through a plurality of runners 4. Although FIG. 1 shows three runners 4, the apparatus 1 may include any number of runners 4 greater than or equal to two. Further, the apparatus 1 may include one or more molds 3 in fluid communication with the same manifold 2, where each mold may include one or more mold cavities therein. Moreover, a single mold 3 cavity may be in fluid communication with one or more runners 4, and a single runner 4 may be in fluid communication with one or more mold 3 cavities.

The apparatus 1 further includes at least one valve 6 disposed in the at least one runner 4, where each valve 6 is in fluid communication with the manifold 2 through its corresponding runner 4, and in fluid communication with the mold 3. A flow aperture area of each valve 6, which determines each valve's flow restriction, may be adjusted by a valve actuator 8, which is driven by valve actuation means 10. The valve actuation means 10 may receive command signals from a controller 12 directing the valve actuation means 10 to move a valve throttling member and thereby adjust a flow area aperture of the valve 6.

Pressurizing means 16 receives a compressible liquid material 5 from a compressible liquid material supply 14, pressurizes the compressible liquid material 5, and delivers the pressurized compressible liquid material 5 to the manifold 2. Each runner 4 receives compressible liquid material 5 from the manifold 2 and directs the compressible liquid material 5 to a valve 6. When in a closed position, each valve 6 isolates the mold 3 from fluid communication with the manifold 2 via its corresponding runner 4. However, when a valve 6 is in an open position (i.e., when the valve has a nonzero flow aperture area therethrough) the mold 3 is in fluid communication with the manifold 2, such that pressurized compressible liquid material 5 may flow from the manifold 2 to one or more mold 3 cavities through the open valve 6.

The pressurizing means 16 may include a pump, a gravitational potential difference, or the like. In one non-limiting embodiment of the present invention the pressurizing means is a rotary pump with a screw-type impeller that is capable of pressurizing the liquid material from about 500 psi to about 10,000 psi, and preferably up to about 5,000 psi.

The apparatus 1 may include a controller 12 that is capable of effecting any data acquisition or control actions disclosed herein. The controller 12 may receive signals from pressure sensors including a manifold pressure sensor 18, a mold pressure sensor 20, or a runner pressure sensor 22. Further, the controller may receive signals from temperature sensors, flow sensors detecting flows of the compressible liquid material 5, a state of the pressurizing means 16, and the like. A state of the pressurizing means 16 may include a speed or orientation of an impeller of a liquid material pump, and in particular, the speed or orientation of a screw impeller of a screw-type pump. Moreover, the controller 12 may receive mold filling process definition parameters from a user interface, machine-readable media, or the like. Further still, the controller may send command signals to the valve actuation means 10 to effect adjustments of the valve 6 flow aperture area by moving a valve throttling member, and send command signals to control operation of the pressurizing means 16.

Figure 2:
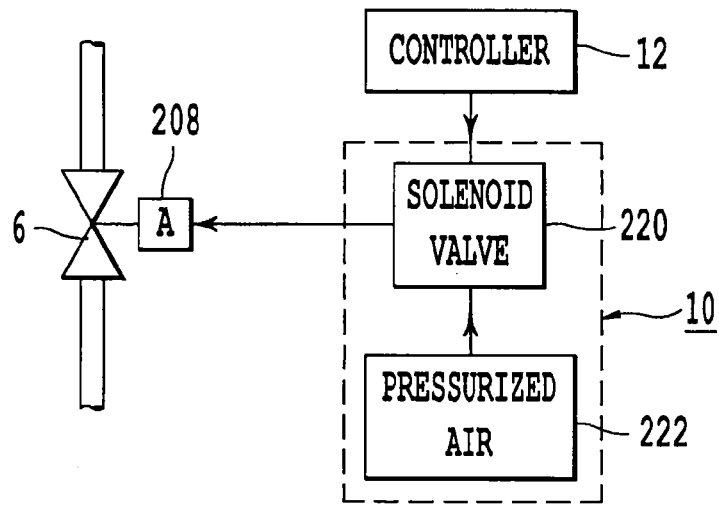
FIG. 2 shows an exemplary embodiment of a pneumatic valve actuator.

FIG. 2 shows an exemplary embodiment of a pneumatic valve actuator 208. The pneumatic valve actuator 208 may be the double-acting type, where venting a chamber on one side of a piston while applying air pressure to the other side of the piston actuates the valve 6 by moving a valve throttling member. In the alternative, the pneumatic valve actuator may be of the air-to-open type or the air-to-close type. A pneumatic valve actuator 208 that is the air-to-open type opens the valve 6 in response to air pressure and closes the valve 6 via a spring return upon venting the applied air pressure. Conversely, a pneumatic actuator 208 that is the air-to-close type will close the valve 6 in response to air pressure and open the valve 6 via a spring return upon venting the applied air pressure. Further, the pneumatic valve actuator 208 may include a valve throttling member position sensor capable of sending a signal indicative of the valve 6 throttling member position to the controller 12, thereby enabling closed loop control of valve 6 flow aperture as a function of time. A non-limiting example of the valve throttling member position sensor is a linear variable differential transformer (LVDT).

Accordingly, the valve actuation means 10 may include a solenoid valve 220 which directs pressurized air 222 to the pneumatic valve actuator 208 when the solenoid valve 220 receives a command signal from the controller 12. A non-limiting example of the solenoid valve 220 is a Direct Operated Poppet Solenoid Valve, part number VQD1151U-5M, as manufactured by SMC Corporation of America.

Figure 3:
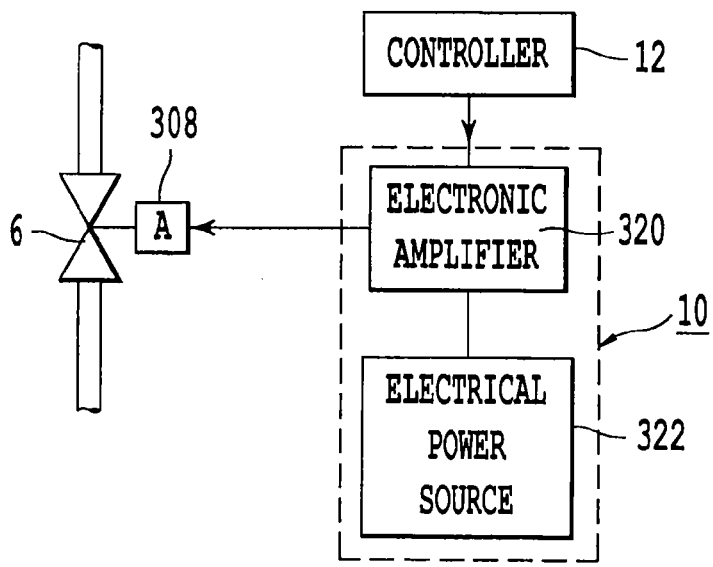
FIG. 3 shows an exemplary embodiment of a servo valve actuator.

FIG. 3 shows an exemplary embodiment of a servo valve actuator 308. The servo valve actuator moves a valve throttling member in response to an electrical signal provided by the valve actuation means 10. A non-limiting example of the servo valve actuator 308 is a linear servo motor such as that used in the Direct Drive Valve (DDV) manufactured by Moog, Incorporated. The servo valve actuator 308 may include a valve throttling member position sensor capable of sending a signal indicative of the valve throttling member position to the controller 12, thereby enabling closed loop control of the valve 6 flow aperture area as a function of time. A non-limiting example of the valve throttling member position sensor is an LVDT. Further, the valve actuation means 10 may include an electrical power source 322 connected to an electronic amplifier 320, which amplifies a valve command signal received from the controller 12 and directs the amplified command signal to the servo valve actuator 308.

FIG. 4a shows an exemplary embodiment of a valve 406 for injecting a compressible liquid material 5 into a mold 3, where the valve 406 is in a closed position. The valve 406 may include a pin 410 disposed within an inner bore of a nozzle 412, such that an annular gap between an outer surface of the pin 410 and an inner surface of the nozzle bore 416 is in fluid communication with the manifold 2 through a corresponding runner 4. The valve 406 is in a closed position when the pin 410 is positioned relative to the nozzle 412 such that an outer surface of pin 410 seals against an inner surface of the nozzle bore 416. When the valve 406 is in the closed position the corresponding runner 4 is isolated from fluid communication with the mold 3 through the valve 406.

FIG. 4b shows an exemplary embodiment of a valve 406 for injecting a compressible liquid material 5 into a mold 3, where the valve 406 is in an open position. When the valve 406 is in an open position, the pin 410 may be located relative to the nozzle 412 such that a flow aperture area is formed between an outer surface of the pin 410 and an inner surface of the nozzle bore 416, which provides fluid communication between the corresponding runner 4 and the mold 3 through the valve 406. In other words, the pin 410 may act as an adjustable valve throttling member within the valve 406.

An outer surface of the nozzle 412 may be disposed in direct contact with the mold 3. The aperture size at the exit of the valve nozzle 412 may range in diameter from about 0.010 inches to about 0.10 inches. Alternatively, the aperture at the exit of the valve nozzle 412 may have a diameter of about 0.030 inches.

Further, when the valve 406 is in an open position, moving the pin 410 relative to the nozzle 416 in a closing direction may decrease the size of the flow aperture area, and moving the pin 410 relative to the nozzle 416 in an opening direction may increase the size of the flow aperture area. Moreover, the valve 406 is in a wide-open configuration when the pin 410 is located relative to the nozzle 416 in the far opening direction, such that either the pin 410 cannot be moved further in the opening direction, or moving the pin 410 even further in the opening direction does not effect a significant increase in the valve 6 flow aperture area.

In one embodiment of the invention, the valve pin 410 includes a projection at an end of the valve pin which projects into the mold 3 when the pin 410 is seated against the nozzle 412 in a closed position. The projection on the valve pin may be used to create an aperture through a molded product by piercing through the molded product during curing of the liquid material into a solid molded product. The projection could be of any elongate shape. Further, the projection may be monolithic with its longitudinal axis aligned with the longitudinal axis of the pin 410, and have a square, circular, or polygonal cross section, or the like.

According to an exemplary embodiment of the invention, at least one valve 6 out of a plurality of valves 6 may be pulsed over a plurality of pulse cycles during one mold filling cycle. Here, one mold filling cycle begins with pressurizing a manifold 2 with a liquid material 5 upstream of one or more empty mold 3 cavities and may end when one or more mold 3 cavities are sufficiently filled with the liquid material 5. Further, a pulse is the procedure of moving the throttling member of the valve 6 from a first position 30 to a second position 32, and then moving the throttling member of the valve 6 from the second position 32 to a third position 34, where the valve 6 flow aperture area corresponding to the second position 32 is greater than the valve 6 flow aperture area corresponding to the first position 30, and the valve 6 flow aperture area corresponding to the third position 34 is less than the valve 6 flow aperture area corresponding to the second position 32.

The plurality of valve pulse cycles during one mold filling cycle acts to transiently decrease the flow through the pulsed valve, thereby providing the benefits of increasing the liquid material pressure upstream of the pulsed valve 6, resetting the viscosity of the liquid material upstream of the valve 6 to a less strained value, or both. Implementing schedules of valve pulsing for at least one of a plurality of valves 6 included in the apparatus 1 may provide the benefit of better tailoring of mold filling rates among the corresponding plurality of runners 4 delivering liquid material to the mold 3. In the case where a plurality of runners 4 provide liquid material to each of a plurality of separate but identical mold cavities, schedules of valve pulsing applied to the corresponding plurality of valves 6 may provide the benefit of promoting more uniform filling rates of each of the plurality of separate but identical mold cavities.

The degree to which the liquid material pressure or viscosity is affected during a valve pulse cycle 100 depends upon the magnitude of valve 6 throttling member movement, and therefore the magnitude of change in valve 6 flow aperture area, between the first position 30, second position 32, and third position 34, as well as the dwell time in each of the first, second, and third valve positions (30, 32, 34).

In an exemplary embodiment of the invention, the valve 6 is closed when the valve 6 is in the first position 30. In another exemplary embodiment of the invention, the valve 6 flow aperture area is not greater than 50% of the maximum flow aperture area of the valve 6, when the valve throttling member is in the first position 30. In yet another exemplary embodiment of the invention, the valve 6 flow aperture area is not greater than 25% of the maximum flow aperture area of the valve 6, when the valve throttling member is in the first position 30.

In an exemplary embodiment of the invention, the valve 6 is wide-open when the valve 6 is in the second position 32. In other words, the valve flow aperture area is maximized when the valve 6 is in the second position 32. In another exemplary embodiment of the invention, the valve 6 flow aperture area is not less than 50% of the maximum flow aperture area of the valve 6, when the valve throttling member is in the second position 32. In yet another exemplary embodiment of the invention, the valve 6 flow aperture area is not less than 75% of the maximum flow aperture area of the valve 6, when the valve flow aperture area is in the second position 32.

In an exemplary embodiment of the invention, the valve 6 is closed when the valve is in the third position 34. In another exemplary embodiment of the invention, the valve 6 flow aperture area is not greater than 50% of the maximum flow aperture area of the valve 6, when the valve throttling member is in the third position 34. In yet another exemplary embodiment of the invention, the valve 6 flow aperture area is not greater than 25% of the maximum flow aperture area of the valve 6, when the valve throttling member is in the third position 34.

The magnitude of the valve 6 throttling member movement between the first, second, and third valve positions may vary between successive pulse cycles for a single valve during one mold filling cycle. Further, the magnitude of the valve 6 throttling member movements during the plurality of pulse cycles 100 may vary between each of a plurality of valves 6 in an apparatus 1. In turn, variability in the magnitude of valve 6 throttling member movements between each of a plurality of valves 6 promotes tailoring of mold filling rates between different runners over time through one mold filling cycle.

Figure 5:
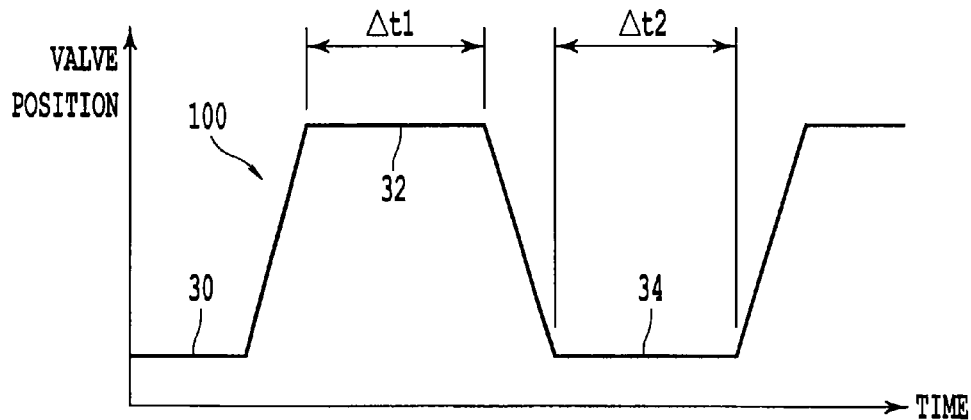
FIG. 5 shows an exemplary embodiment of valve position versus time during a valve pulse, where the valve dwells in a second position for a first time duration and dwells in a third position for a second time duration.

FIG. 5 shows an exemplary embodiment of the valve 6 position versus time during a valve pulse 100, where the valve throttling member dwells in a second position 32 for a first time duration Δt1 and dwells in a third position 34 for a second time duration Δt2. Accordingly, the dwell times in the second position 32 and the third position 34, respectively, are both greater than zero.

Figure 6:
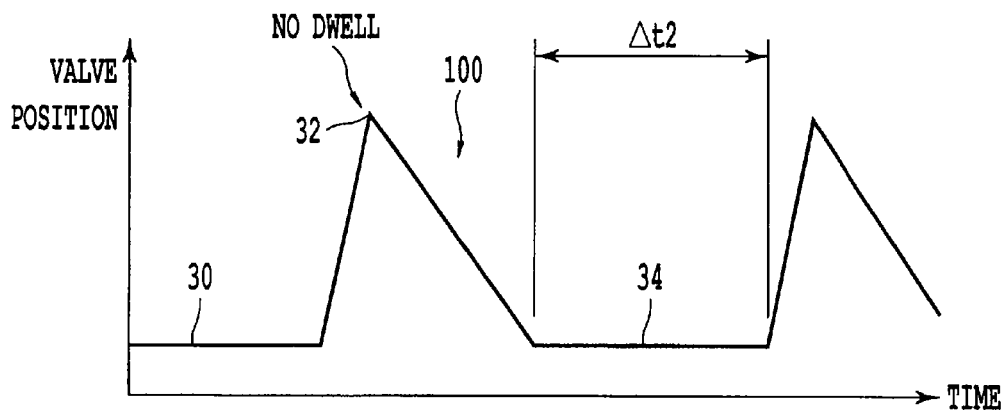
FIG. 6 shows an exemplary embodiment of valve position versus time during a valve pulse, where the valve does not dwell in a second position, but the valve dwells in a third position for a second time duration.

FIG. 6 shows an exemplary embodiment of the valve 6 position versus time during a valve pulse 100, where the valve throttling member does not dwell in a second position 32, but the valve throttling member dwells in a third position 34 for a second time duration Δt2. Accordingly, for the circumstance where the valve does not dwell in the second position 32 during the pulse 100, the second position 32 may be identified as the local maximum in valve position between the first position 30 and the third position 34.

Figure 7:
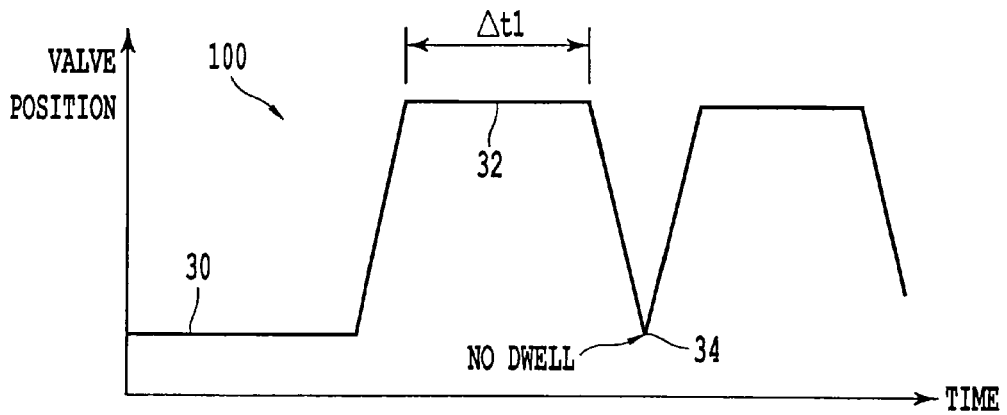
FIG. 7 shows an exemplary embodiment of valve position versus time during a valve pulse, where the valve dwells in a second position for a first time duration, but the valve does not dwell in a third position.

FIG. 7 shows an exemplary embodiment of the valve 6 position versus time during a valve pulse 100, where the valve throttling member dwells in a second position 32 for a first time duration Δt1, but the valve throttling member does not dwell in a third position 34. Accordingly, for the circumstance where the valve does not dwell in the third position 34 during the pulse 100, the third position 34 may be identified as the local minimum in valve position between the second position 32 and the beginning of the subsequent pulse cycle.

Figure 8:
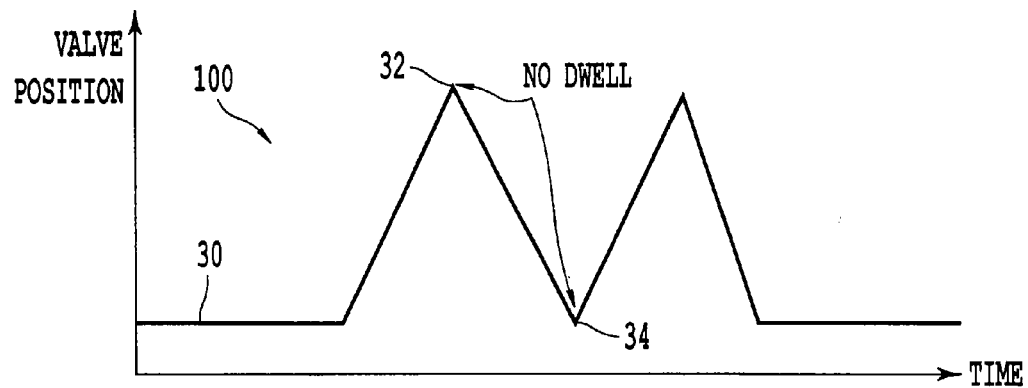
FIG. 8 shows an exemplary embodiment of valve position versus time during a valve pulse, where the valve does not dwell in either a second position or a third position.

FIG. 8 shows an exemplary embodiment of the valve 6 position versus time during a valve pulse 100, where the valve throttling member does not dwell in either a second position 32 or a third position 34. Accordingly, for the circumstance where the valve throttling member does not dwell in either the second position 32 or the third position 34, the second position 32 may be identified as the local maximum in valve position between the first position 30 and the third position 34, and the third position 34 may be identified as the local minimum in valve position between the second position 32 and the beginning of the subsequent pulse cycle.

The choice of the first time duration Δt1 and the second time duration Δt2 may depend on the material properties of the compressible liquid material 5 including, for example, density, nominal viscosity (absent shear), and variation in viscosity as a function of liquid shearing. Non-limiting examples of the liquid material 5 include liquid silicone rubber (LSR), thermal plastic elastomer (TPE), high consistency rubber (HCR, also known as gum silicone), and natural rubber compounds (hereinafter "rubber"). Non-limiting examples of effective dwell time ranges and preferred dwell time ranges for various materials are shown in Table 1.

TABLE 1

Non-limiting examples of effective dwell time ranges and preferred dwell time ranges for various materials

| Material | Ranges for the first time duration, Δt1, seconds | | Ranges for the second time duration, Δt2, seconds | |
| --- | --- | --- | --- | --- |
| | Effective | Preferred | Effective | Preferred |
| LSR | 0.01-5 | 0.02-0.08 | 0.01-5 | 0.1-0.2 |
| TPE | 0.01-5 | 0.02-0.08 | 0.01-5 | 0.1-0.2 |
| HCR | 0.03-5 | 0.08-0.2 | 0.03-5 | 0.15-0.3 |
| Rubber | 0.1-10 | 0.2-0.5 | 0.1-10 | 0.2-0.5 |

A range of viscosities exist for each of the materials listed in Table 1, depending upon the particular grade of the material and variations in composition. Accordingly, the estimates for dwell times in Table 1 are based on the material properties for a typical or common grade of the material, as well as the input pressure and volume of material supplied to the manifold.

In another embodiment of the invention the liquid material 5 is an edible food product. In yet another embodiment of the invention, the liquid material 5 is an inedible, non-food product.

The temperature of thermoset liquid materials in the apparatus 1 may range from about 50-230 degrees Fahrenheit. The temperature of thermoplastic liquid materials in the apparatus 1 may range from about 350-550 degrees Fahrenheit.

In another exemplary embodiment of the invention, the liquid material 5 is selected from the group consisting of LSR, TPE, HCR, and natural rubber compounds, and there is no dwell in the second position 32, the third position 34, or both.

Figure 9A:
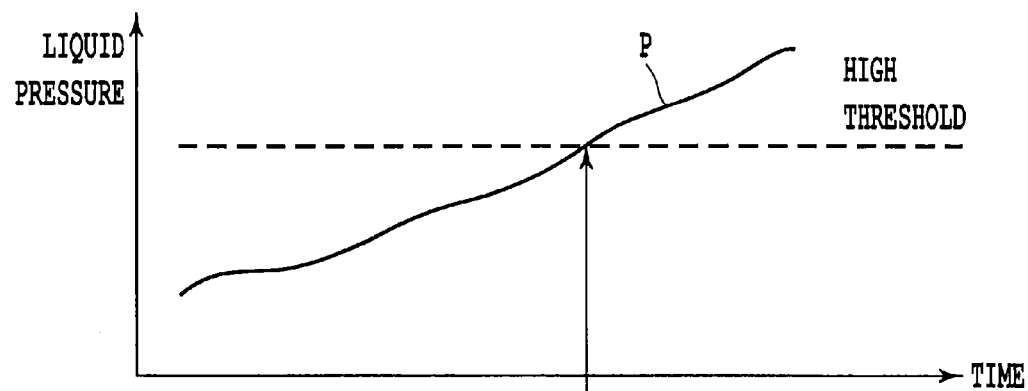
FIG. 9a shows a liquid pressure measurement exceeding a high threshold value over time.
Figure 9B:
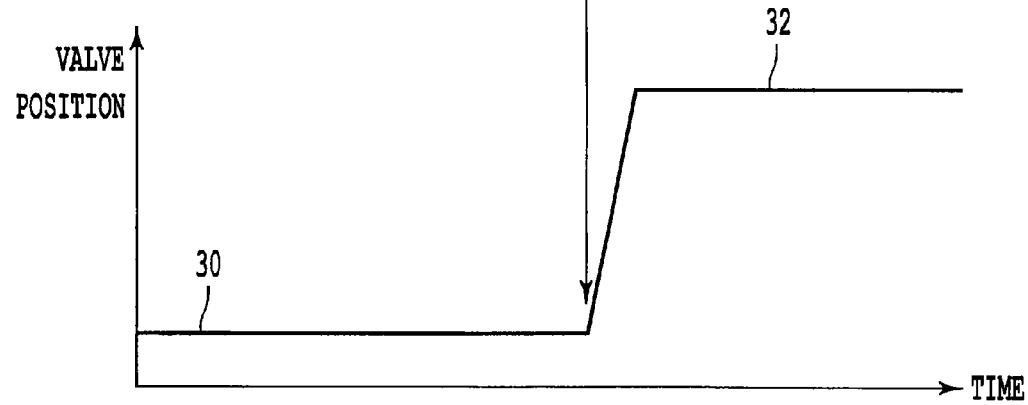
FIG. 9b shows an exemplary embodiment of adjusting a valve position from a first position to a second position in response to the liquid pressure measurement of FIG. 9a exceeding a high threshold value.

FIG. 9a shows a liquid pressure measurement P exceeding a high threshold value over time. FIG. 9b shows an exemplary embodiment of adjusting a valve position from a first position 30 to a second position 32 in response to a measurement of the liquid material pressure P of FIG. 9a exceeding a high threshold value, where FIGS. 9a and 9b share a common time coordinate.

Figure 10A:
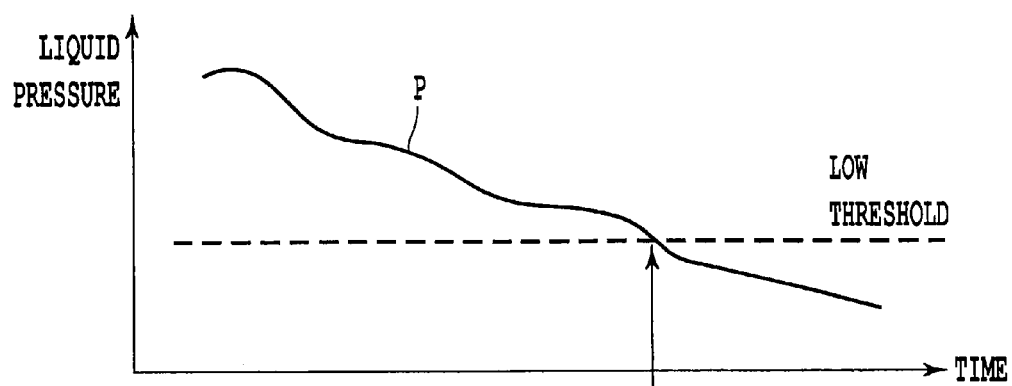
FIG. 10a shows a liquid pressure measurement decreasing below a low threshold value over time.
Figure 10B:
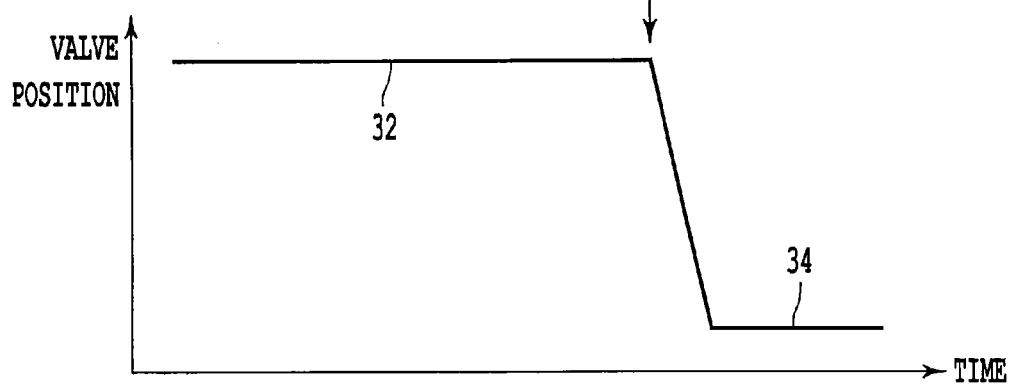
FIG. 10b shows an exemplary embodiment of adjusting a valve position from a second position to a third position in response to the liquid pressure measurement of FIG. 10a decreasing below a low threshold value.

FIG. 10a shows a liquid pressure measurement P decreasing below a low threshold value over time. FIG. 10b shows an exemplary embodiment of adjusting a valve position from a second position 32 to a third position 34 in response to a measurement of the liquid material pressure P of FIG. 10a decreasing below a low threshold value, where FIGS. 10a and 10b share a common time coordinate.

Figure 11A:
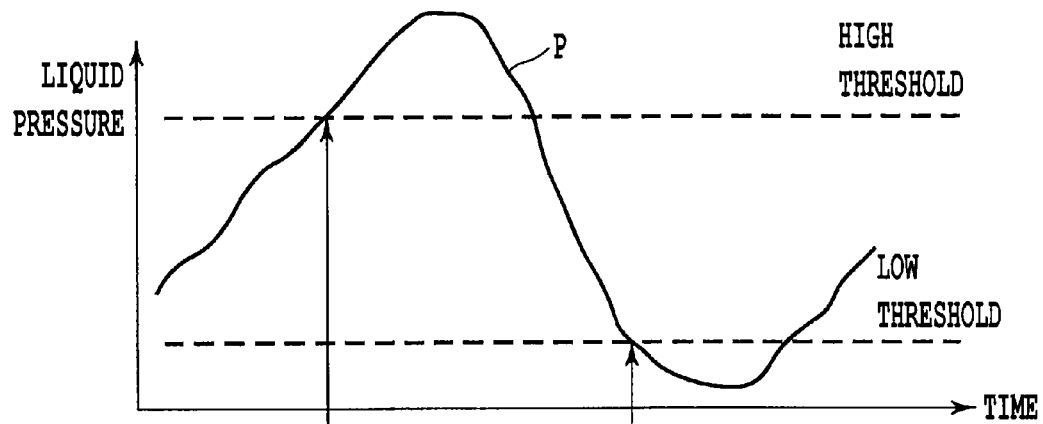
FIG. 11a shows a liquid pressure measurement increasing above a high threshold value and then decreasing below a low threshold value over time.
Figure 11B:
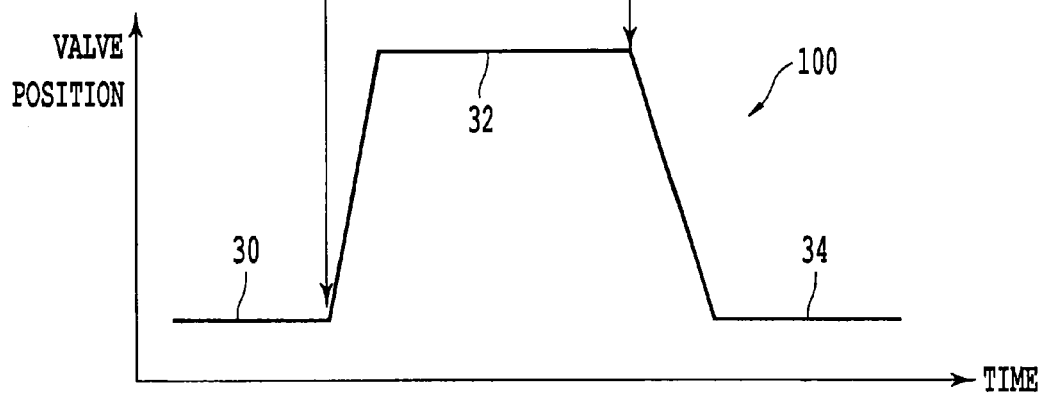

FIG. 11a shows a liquid material pressure measurement P increasing above a high threshold value and then decreasing below a low threshold value over time. FIG. 11b shows an exemplary embodiment of pulsing a valve in response to the liquid material pressure measurement P of FIG. 11a, where FIGS. 11a and 11b share a common time coordinate.

The liquid material pressure rises in response to the relatively small valve flow aperture area when the valve is in the first position 30 by applying back pressure to the pressurizing means 16. Next, the liquid pressure rising above the high threshold value triggers an opening of the valve flow area aperture from the first position 30 to the second position 32. Accordingly, as the flow of liquid material increases due to the opening of the valve 6 to the second position 32, the liquid material pressure decreases because of a decrease in back pressure against the pressurizing means 16.

Eventually, the liquid material pressure decreases below the low threshold value, thereby triggering a closing of the valve 6 flow aperture area from the second position 32 to the third position 34. In turn, the valve 6 is subjected to a pulse cycle 100 based on a comparison of liquid material pressure measurements to a high threshold value and a low threshold value. In a non-limiting example, the high threshold value is 800 psi and the low threshold value is 600 psi. Alternatively, the pulse control actions may be based on liquid material pressure measured anywhere upstream of the valve 6 flow aperture, including the manifold 2, a runner 4, or within the valve 6.

In another embodiment of the invention, the measured value used to trigger a valve 6 pulse cycle 100 could be a measurement of the orientation of an impeller within the pressurizing means 16, a flow rate of liquid material 5 through a runner 4, a temperature of the liquid material 5, or the like.

FIGS. 12-17 show exemplary embodiments of methods for moving a valve 6 throttling member from a first position 30 to a second position 32, and moving a valve 6 throttling member from the second position 32 to a third position 34, which may be applied in various combinations to modulate at least one valve to perform a plurality of pulse cycles during one filling cycle of the mold.

Figure 12:
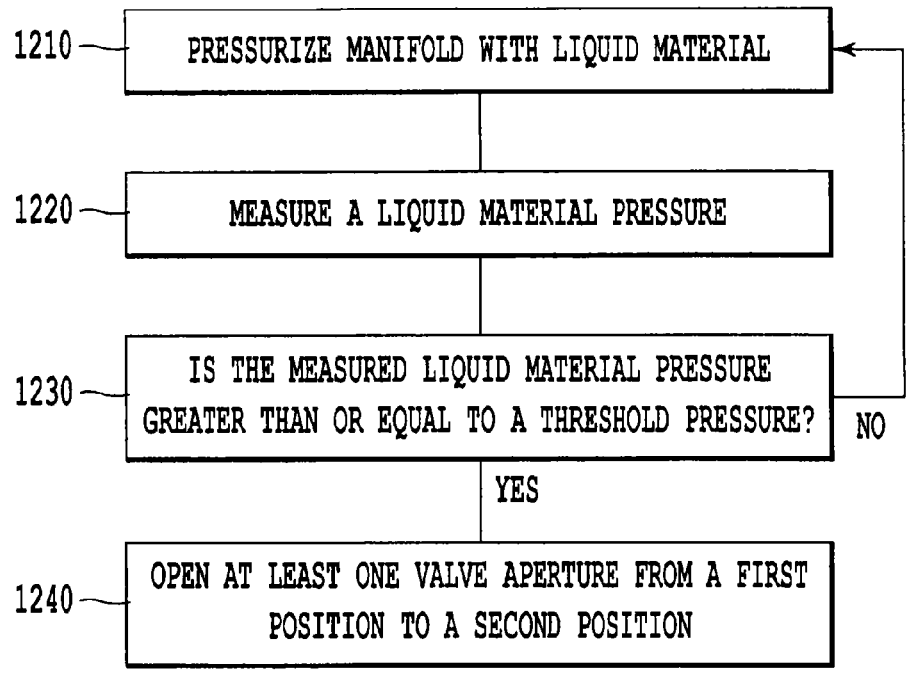
FIG. 12 shows a flowchart for an exemplary embodiment of a method for adjusting at least one valve from a first position to a second position based on a liquid material pressure measurement.

FIG. 12 shows a flowchart for an exemplary embodiment of a method for adjusting at least one valve from a first position 30 to a second position 32 based on a liquid material pressure measurement. In step 1210, the manifold 2 is pressurized with a liquid material. Next, in step 1220 a pressure of the liquid material is measured. Then, in step 1230 the liquid material pressure measurement is compared to a threshold pressure. If the measured liquid material pressure is not greater than or equal to the threshold pressure, then the method proceeds to step 1210. Alternatively, if the measured liquid material pressure is greater than or equal to the threshold pressure, then the method proceeds to step 1240. In step 1240, at least one valve 6 flow aperture area is opened from a first position 30 to a second position 32.

Figure 13:
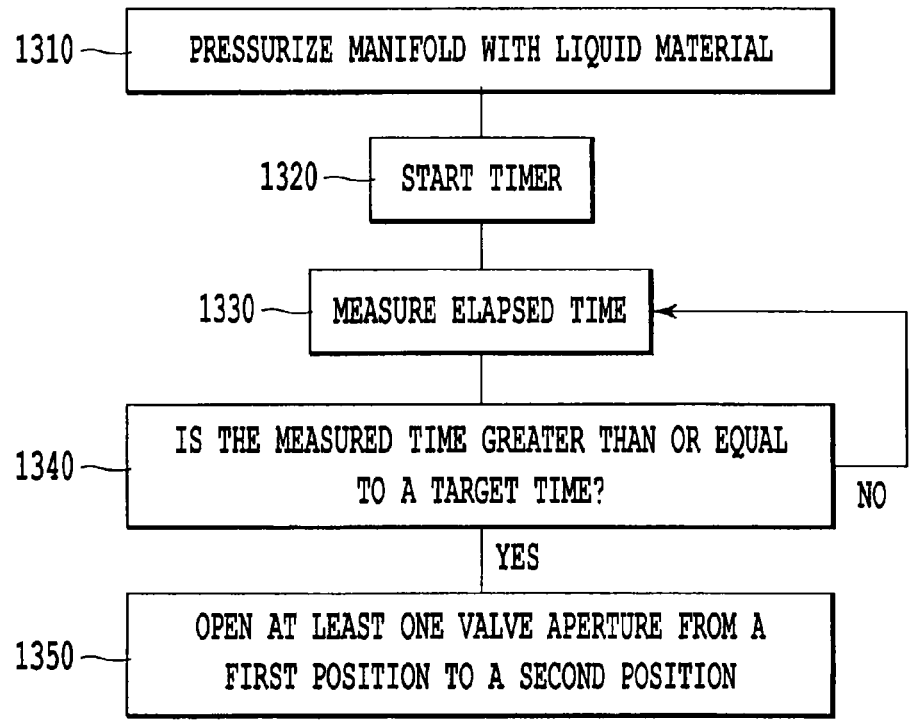
FIG. 13 shows a flowchart for an exemplary embodiment of a method for adjusting at least one valve from a first position to a second position based on a target dwell time.

FIG. 13 shows a flowchart for an exemplary embodiment of a method for adjusting at least one valve from a first position 30 to a second position 32 based on a target dwell time. In step 1310, the manifold 2 is pressurized with a liquid material. Next, in step 1320 a timer is started. Then, in step 1330 the elapsed time on the timer is measured. In step 1340 the elapsed time measured from the timer is compared to a target time. If the measured time is not greater than or equal to the target time, then the method proceeds to step 1330. Alternatively, if the measured time is greater than or equal to the target time, then the method proceeds to step 1350. In step 1350 at least one valve 6 flow aperture area is opened from a first position 30 to a second position 32 by moving the throttling member of the at least one valve.

Figure 14:
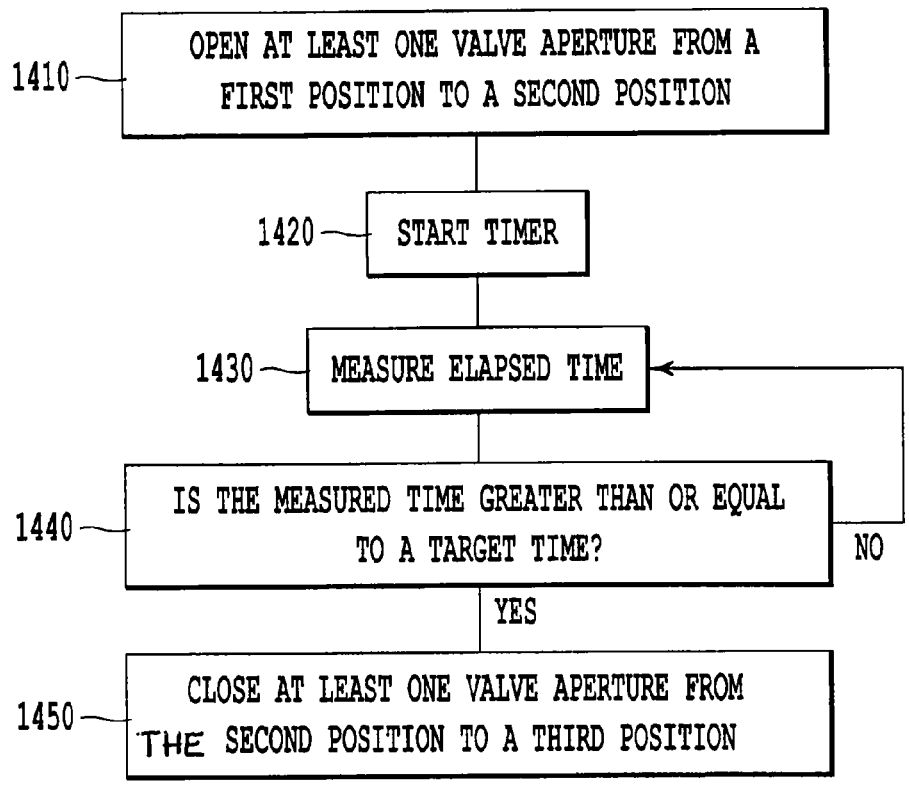
FIG. 14 shows a flowchart for an exemplary embodiment of a method for adjusting at least one valve from a second position to a third position based on a target dwell time.

FIG. 14 shows a flowchart for an exemplary embodiment of a method for adjusting at least one valve from a second position 32 to a third position 34 based on a target dwell time. In step 1410 at least one valve 6 flow aperture area is opened from a first position 30 to a second position 32 by moving the throttling member of the at least one valve. Next, in step 1420 a timer is started. Then, in step 1430 the elapsed time on the timer is measured. In step 1440 the elapsed time measured from the timer is compared to a target time. If the measured time is not greater than or equal to the target time, then the method proceeds to step 1430. Alternatively, if the measured time is greater than or equal to the target time, then the method proceeds to step 1450. In step 1450, at least one valve 6 flow aperture area is closed from the second position 32 to a third position 34 by moving the throttling member of the at least one valve.

Figure 15:
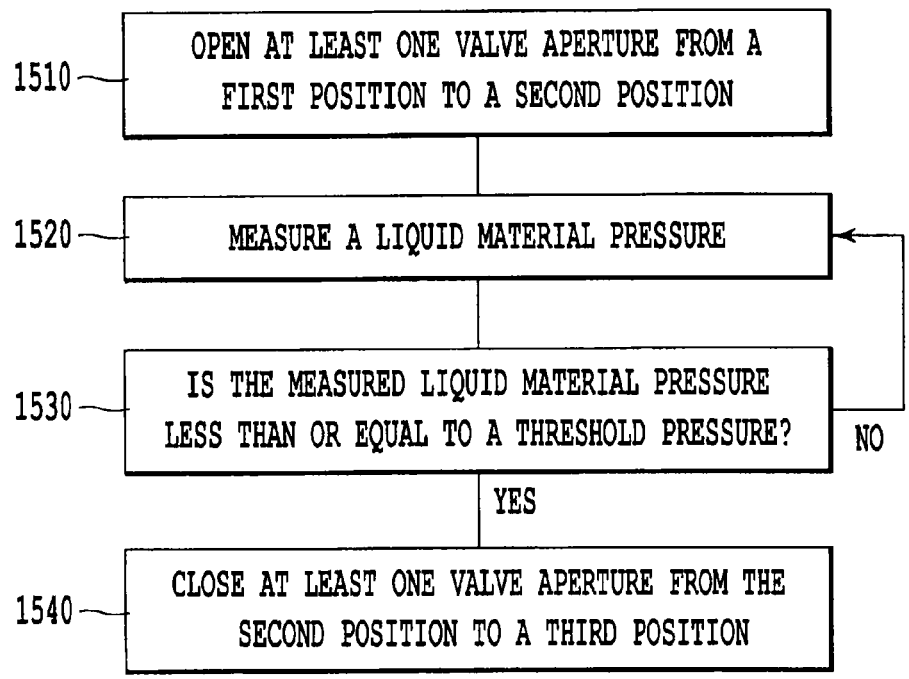
FIG. 15 shows a flowchart for an exemplary embodiment of a method for adjusting at least one valve from a second position to a third position based on a liquid material pressure measurement.

FIG. 15 shows a flowchart for an exemplary embodiment of a method for adjusting at least one valve from a second position to a third position based on a liquid material pressure measurement. In step 1510, at least one valve 6 flow aperture area is opened from a first position 30 to a second position 32 by moving the throttling member of the at least one valve. Next, in step 1520 a pressure of the liquid material is measured. Then, in step 1530 the liquid material pressure measurement is compared to a threshold pressure. If the measured liquid material pressure is not less than or equal to the threshold pressure, then the method proceeds to step 1520. Alternatively, if the measured liquid material pressure is greater than or equal to the threshold pressure, then the method proceeds to step 1540. In step 1540, at least one valve 6 flow aperture area is closed from the second position 32 to a third position 34 by moving the throttling member of the at least one valve.

In a non-limiting example for a method of operating apparatus 1, each of the plurality of valves 6 are triggered to open from a first position 30 to a second position 32 when a single measurement of the liquid material reaches a high threshold value, and then each of the plurality of valves 6 dwells in the second position 32 for a predetermined dwell time. At the end of the predetermined dwell time, each of the plurality of valves 6 are triggered to close from the second position 32 to a third position 34.

In another non-limiting example for a method of operating apparatus 1, each of the plurality of valves are triggered to open from a first position 30 to a second position 32 when a measurement of the liquid material pressure crosses a high threshold value. Next, each of the plurality of valves 6 dwells in the second position until the measurement of the liquid material pressure crosses a low threshold value, which triggers the each of the plurality of valves 6 to close from the second position 32 to a third position 34.

Figure 16:
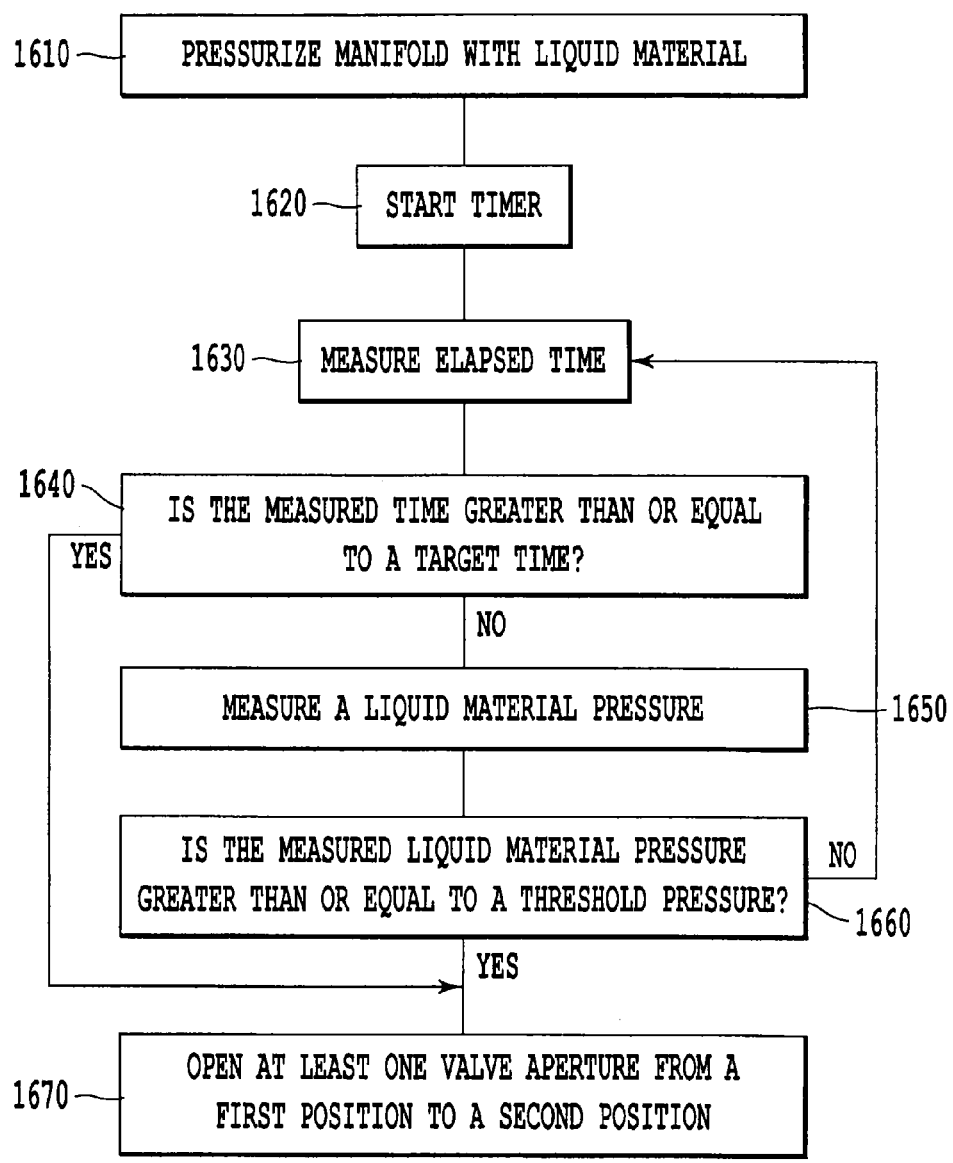
FIG. 16 shows a flowchart for an exemplary embodiment of a method for adjusting at least one valve from a first position to a second position based on either a target dwell time or a liquid material pressure measurement.

FIG. 16 shows a flowchart for an exemplary embodiment of a method for adjusting at least one valve from a first position to a second position based on either a target dwell time or a liquid material pressure measurement. In step 1610 a manifold 2 is pressurized with a liquid material. Next, in step 1620 a timer is started. Then, in step 1630 the elapsed time on the timer is measured. In step 1640 the measured time is compared to a target time. If the measured time is greater than or equal to the target time then the method proceeds to step 1670. Alternatively, if the measured time is not greater than or equal to the target time then the method proceeds to step 1650.

In step 1650 a liquid material pressure is measured. Then, in step 1660 the measured liquid material pressure is compared to a threshold pressure. If the measured liquid material pressure is not greater than or equal to the threshold pressure, then the method proceeds to step 1630. Alternatively, if the measured liquid material pressure is greater than or equal to the threshold pressure, then the method proceeds to step 1670. In step 1670 at least one valve 6 flow aperture area is opened from a first position 30 to a second position 32 by moving the at least one valve throttling member.

Figure 17:
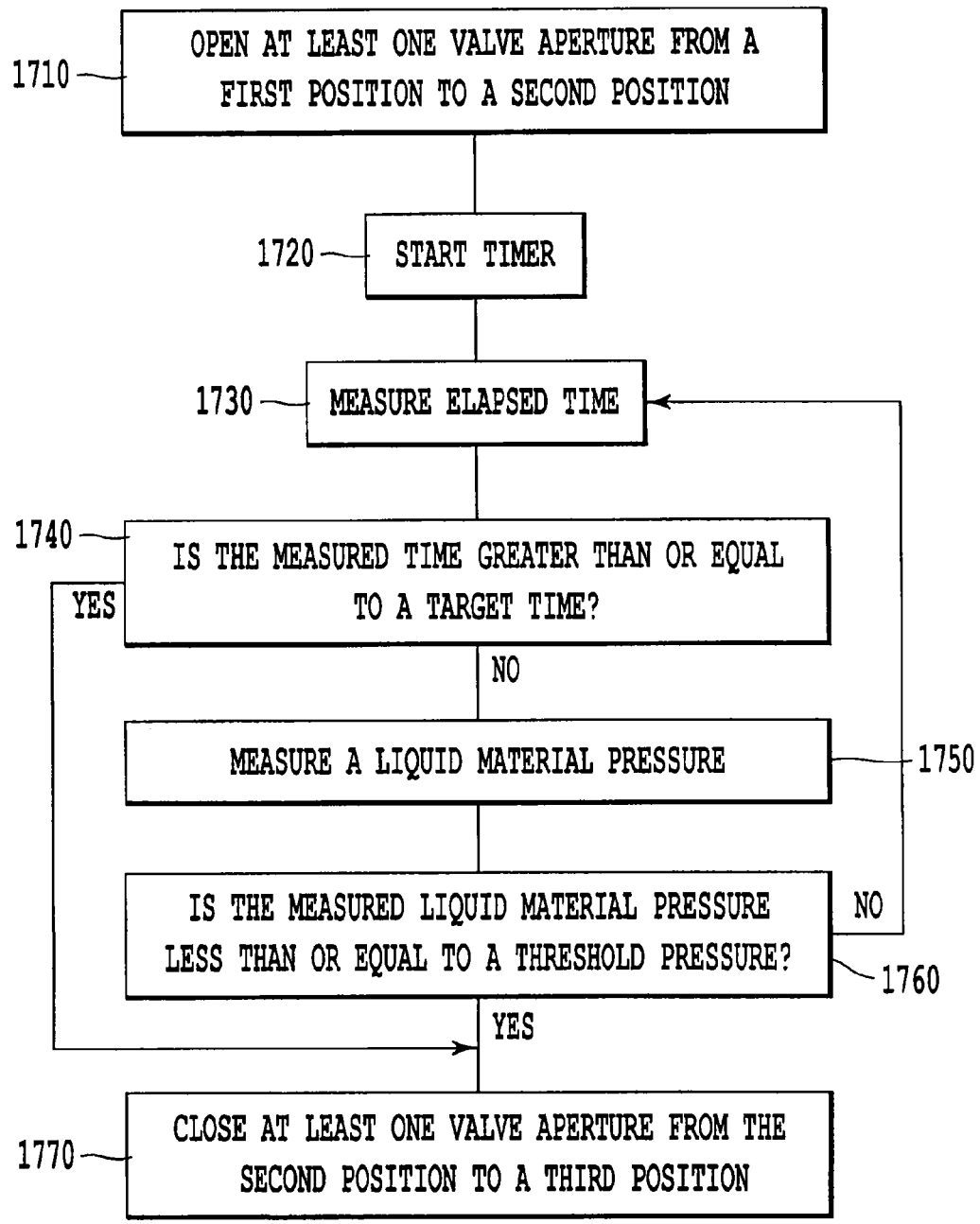
FIG. 17 shows a flowchart for an exemplary embodiment of a method for adjusting at least one valve from a second position to a third position based on either a target dwell time or a liquid material pressure measurement.

FIG. 17 shows a flowchart for an exemplary embodiment of a method for adjusting at least one valve from a second position to a third position based on either a target dwell time or a liquid material pressure measurement. In step 1710 at least one valve 6 flow aperture area is opened from a first position 30 to a second position 32. In step 1720 a timer is started. Then, in step 1730 the elapsed time on the timer is measured. In step 1740 the measured time is compared to a target time. If the measured time is greater than or equal to the target time then the method proceeds to step 1770. Alternatively, if the measured time is not greater than or equal to the target time then the method proceeds to step 1750.

In step 1750 a liquid material pressure is measured. Then, in step 1760 the measured liquid material pressure is compared to a threshold pressure. If the measured liquid material pressure is not less than or equal to the threshold pressure, then the method proceeds to step 1730. Alternatively, if the measured liquid material pressure is less than or equal to the threshold pressure, then the method proceeds to step 1770. In step 1770 at least one valve 6 flow aperture area is closed from the second position 32 to a third position 34 by moving the at least one valve throttling member.

FIG. 18 shows an exemplary embodiment of valve pulsing schedules for a plurality of valves 6 in an apparatus 1 for filling a mold with a compressible liquid material. The valve control signals shown could be electrical signals generated by the controller 12, or electrical or pneumatic signals generated by the valve actuation means 10. In FIG. 18, a higher value of the valve control signal commands a valve 6 flow aperture area that is larger than a lower value of the valve control signal. In addition to the square wave valve control signal profiles shown in FIG. 18, the control signal wave form could also assume other profiles including, but not limited to, a saw-tooth profile, a sinusoidal profile, or the like.

The plurality of valves in FIG. 18 includes Valves 1-4, and the control signals for each of Valves 1-4 share a common time coordinate. FIG. 18a shows a control signal for Valve 1 that effects three pulse cycles (102, 104, 106). FIG. 18d shows a control signal for Valve 4 with identical pulse timing to that of Valve 1, which effects three pulse cycles (116, 118, and 120).

FIG. 18b shows a control signal for Valve 2 that effects two pulse cycles (108 and 110). The pulse cycles 108 and 110 for Valve 2 begin at the same time as the pulse cycles 102 and 106. However, the durations for pulse cycles 108 and 110 are different from the durations for pulse cycles 102 and 106.

FIG. 18c shows a control signal for Valve 3 that effects two pulse cycles (112 and 114). The timing for initiation of the Valve 3 pulse cycles 112 and 114 is different from the pulse initiation timing for any of Valves 1-2 or 4. Further, the durations for the pulse cycles 112 and 114 are different from any of the pulse durations for Valves 1-2 or 4. Indeed, all of the plurality of valves 6 may be pulsed in a synchronous fashion, however no synchronization of the valve pulse cycles among the plurality of valves 6 is required.

In one embodiment of the invention there exists an initial delay stage between the start of pressurizing the manifold 2 and triggering any of the plurality of pulse cycles during one mold filling cycle. All of the valves 6 in the apparatus 1 are in closed positions during the initial delay stage. The delay stage ends when either a predetermined initial delay stage time has elapsed or a valve pulse cycle 100 is triggered by a measured value crossing a threshold value. Non-limiting examples of measured values that could trigger the end of the initial delay stage include a liquid material pressure measurement upstream of a valve 6 flow aperture, an orientation of an impeller within the pressurizing means 16, a temperature measured within the mold 3 cavity, or a pressure measured within the mold 3 cavity.

The definition of the end of the initial delay stage may be defined separately for each of the plurality of valves 6 in the apparatus 1. For example, in an apparatus 1 including eight valves 6, the initial delay stage for six of the valves may end following a first predetermined time period, and the initial delay stage for the remaining two valves 6 may end following a second predetermined time period, where the second predetermined time period is greater than the first predetermined time period. Alternatively, the end of the initial delay stage for each of a plurality of valves 6 in apparatus 1 could be triggered by a measured value crossing a threshold value, where the threshold value to end the initial delay stage for each valve may be different for each corresponding valve. In addition, the end of the initial delay stage for each of a plurality of valves 6 in apparatus 1 could be triggered by different measured values.

In one embodiment of the invention the last 5-15% of liquid material is delivered to the mold in final pulse cycle with reduced supply pressure to avoid pressure waves caused by pumping action of the valve pulses at higher supply pressures and thereby promote uniform pressure within the mold at the end of the mold filling cycle. The final pulse cycle duration may be determined by a predetermined dwell time for all of the valves 6 in a second position 32, or separate predetermined dwell times for each of a plurality of valves 6 in a second position 32. Alternatively, the final pulse cycle duration may be determined by comparing a measured value to a threshold value that triggers all of the valves 6 to close from a second position 32 to a third position 34, or a plurality of measured values trigger each of a corresponding plurality of valves 6 to close from a second position 32 to a third position 34. Non-limiting examples of measured values that may be used to define the duration of a final pulse cycle include liquid material pressures or temperatures measured within the mold, or an orientation of an impeller within the pressurizing means 16

Non-limiting examples of parameters that may be used to define the end of the mold filling cycle include a total number of pulse cycles, an integrated sum of time that the valves 6 were in an open state, a time integration of liquid material 5 flows, measurements of liquid material pressure or temperature in the mold 3, a change in impeller orientation within the pressurizing means 16, or a total elapsed time.

The total number of pulse cycles during one mold filling cycle may depend upon the volume of one or more mold 3 cavities to be filled, the flow aperture area of the valves 6, the delivery pressure of the liquid material 5, the compressibility of the liquid material 5, the nominal viscosity of the liquid material 5, and the dependency of the liquid material viscosity on shear. Accordingly, the total number of pulse cycles during one mold filling cycle could be any integer greater than or equal to two. In one embodiment of the invention the number of pulse cycles in one mold filling cycle is not less than three. In another embodiment of the invention the number of pulse cycles in one mold filling cycle is not less than five. In yet another embodiment of the invention the number of pulse cycles in one mold filling cycle is not less than ten. In still yet another embodiment of the invention the number of pulse cycles in one mold filling cycle is not less than twenty.

In one embodiment of the invention, a total time to complete one mold filling cycle divided by a first time duration $\Delta t1$ is greater than two. In another embodiment of the invention, a total time to complete one mold filling cycle divided by a first time duration $\Delta t1$ is greater than five. In yet another embodiment of the invention, a total time to complete one mold filling cycle divided by a first time duration $\Delta t1$ is greater than ten.

In one embodiment of the invention, the controller 12 may include a manual interface for controlling a menu of control parameters. The menu of control parameters may include valve dwell times or threshold values for comparison with measured values to trigger valve motion as part of the plurality of pulse cycles during one mold filling cycle. A programmable logic controller (PLC) may be employed as a means of processing those control parameters within the controller 12. Alternatively, any operating system, such as Microsoft Windows 7, UNIX, Solaris, LINUX, Apple MAC-OS, and other systems known to those skilled in the art, may be used as a means of processing the control parameters within the controller 12. Further, the manual interface may be a computer interface.

An embodiment of the invention may include data storage accessible by the controller 12 for storing process settings. Further, the controller 12 may receive pulse cycle control parameters by a network connection to a user interface or remote data storage. As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G, and 4G wireless cellular systems. The wireless network can also be WiFi, Bluetooth, or any other wireless form of communication that is known.

In one embodiment of the invention, operation of the valve 6 pulse sequences is interlocked with measured or sensed parameters through the controller 12, in order to override a pulse sequence in the event of a stoppage or sensed alarm state of the molding machine. Further, the controller may allow a user to produce a menu of recipes for pulse sequences that can be stored either internally or externally for use with particular molds.

An embodiment of the invention may include an article of manufacture comprising a non-transitory machine-readable medium having instructions encoded thereon for enabling a processor to fill a mold with a compressible liquid material by executing any of the method steps or control operations disclosed herein. Non-limiting examples of the non-transitory machine-readable medium for storing instructions include CDs, DVDs, in FLASH memory, RAM, ROM, PROM, EPROM, EEPROM, hard disk or any other information processing device with which the controller 12 communicates, such as a server or computer.

Moreover, the pulse cycle control parameters stored in the data storage may be selected based on measured values during a mold filling cycle. For example, different pulse-defining parameters, such as dwell times and threshold trigger values, and the like, could vary through a mold filling cycle depending on a measured value such as an orientation of an impeller within the pressurizing means 16, a pressure or temperature of the liquid material 5, or an indication of mold filling progress such as a percentage of mold volume filled.

In an embodiment of the invention a valve position dwell time is set to a first value when a measured value is less than a measured value threshold, and the valve position dwell time parameter is set to a second value when the measured value is greater than the measured value threshold. In another embodiment of the invention, a liquid material pressure threshold parameter is set to a first value when a measured value is less than a measured value threshold, and the liquid material pressure threshold is set to a second value when the measured value is greater than a measured value threshold, where either a valve opening or closing pulsing action is triggered by a measured liquid material pressure P crossing the liquid material pressure threshold.

Numerous modifications and variations of the present invention are possible in light of the above teachings. It is therefore to be understood that within the scope of the appended claims, the invention may be practiced otherwise than as specifically described herein.

We claim:

1. A method for filling a mold with a compressible liquid material, the mold connected to a manifold via a plurality of runners, at least one valve disposed in at least one of the plurality of runners, such that the at least one valve is in fluid communication with both the manifold and the mold, the method comprising:
    pressurizing the manifold with the compressible liquid material;
    modulating the at least one valve to perform a first plurality of pulse cycles during one filling cycle of the mold, wherein
    a first pulse cycle of the first plurality of pulse cycles includes
        moving a throttling member of the at least one valve from a first position to a second position, and
        moving a throttling member of the at least one valve from the second position to a third position,
    a flow aperture area of the at least one valve corresponding to the second position is larger than the a flow aperture area of the at least one valve corresponding to the first position,
    a flow aperture area of the at least one valve corresponding to the third position is smaller than the flow aperture area of the at least one valve corresponding to the second position,
    the throttling member of the at least one valve is moved from the first position to the second position when a measured dwell time in the first position is greater than or equal to a first target time, and when the measured dwell time in the first position is less than the first target time after a measured pressure of the compressible liquid material becomes greater than or equal to a first threshold pressure, and
    the throttling member of the at least one valve is moved from the second position to the third position when a measured dwell time in the second position is greater than or equal to a second target time, and when the measured dwell time in the second position is less than the second target time after the measured pressure of the compressible liquid material becomes less than or equal to a second threshold pressure.

2. The method according to claim 1, wherein the first pulse cycle further includes causing the throttling member of the at least one valve to dwell in the second position for a first time duration.

3. The method according to claim 1, wherein the first pulse cycle further includes causing the throttling member of the at least one valve to dwell in the third position for a second time duration.

4. The method according to claim 1, wherein the at least one valve is closed when the throttling member of the at least one valve is in the first position.

5. The method according to claim 4, wherein the flow aperture area of the at least one valve is maximized when the throttling member of the at least one valve is in the second position.

6. The method according to claim 5, wherein the at least one valve is closed when the throttling member of the at least one valve is in the third position.

7. The method according to claim 1, wherein the flow aperture area of the at least one valve is less than 50% of a maximum aperture of the at least one valve, when the throttling member of the at least one valve is in the first position.

8. The method according to claim 7, wherein the flow aperture area of the at least one valve is greater than 50% of a maximum flow aperture area of the at least one valve, when the throttling member of the at least one valve is in the second position.

9. The method according to claim 8, wherein the flow aperture area of the at least one valve is less than 50% of a maximum flow aperture area of the at least one valve, when the throttling member of the at least one valve is in the third position.

10. The method according to claim 2, wherein the first time duration ranges from about 0.02 seconds to about 10 seconds.

11. The method according to claim 10, wherein the first time duration ranges from about 0.02 seconds to about 0.08 seconds.

12. The method according to claim 3, wherein the second time duration ranges from about 0.1 seconds to about 10 seconds.

13. The method according to claim 12, wherein the second time duration ranges from about 0.1 seconds to about 0.2 seconds.

14. The method according to claim 1, wherein
    the at least one valve consists of a plurality of valves, and each valve of the plurality of valves is disposed in a separate runner.

15. The method according to claim 14, wherein
the plurality of valves includes a second valve,
the second valve is modulated to perform a second plurality of pulse cycles during the one filling cycle of the mold,
a first pulse cycle of the second plurality of pulse cycles includes
moving a throttling member of the second valve from a fourth position to a fifth position, and
moving the throttling member of the second valve from the fifth position to a sixth position,
the flow aperture area corresponding to the fifth position is larger than the flow aperture area corresponding to the fourth position, and
the flow aperture area corresponding to the sixth position is smaller than the flow aperture area corresponding to the fifth position.

16. The method according to claim 1, wherein at least one pulse cycle of the first plurality of pulse cycles begins at a predetermined time during the one filling cycle of the mold.

17. The method according to claim 1, wherein at least one pulse cycle of the first plurality of pulse cycles is triggered based on a measurement of a state of the compressible liquid material during the one filling cycle of the mold.

18. The method according to claim 1, wherein the pressure of the compressible liquid material is measured upstream of the at least one valve.

19. The method according to claim 1, wherein the throttling member of the at least one valve dwells in a wide open position until a measurement of a pressure of the compressible liquid material decreases below a threshold pressure during the one filling cycle of the mold.

20. The method according to claim 1, wherein the throttling member of the at least one valve dwells in a closed position until a measurement of a pressure of the compressible liquid material increases above a threshold pressure during the one filling cycle of the mold.

21. The method according to claim 1, wherein the first plurality of pulse cycles consists of at least 5 pulse cycles.

22. The method according to claim 1, wherein the compressible liquid material is selected from the group consisting of a liquid silicone rubber, a thermal plastic elastomer, a high consistency rubber, and a natural rubber compound.

23. The method according to claim 22, wherein the compressible liquid material is the liquid silicone rubber.

24. The method according to claim 1, wherein the first threshold pressure is greater than the second threshold pressure.

25. The method according to claim 1, wherein the compressible liquid material is a thermoset material.

26. An apparatus for filling a mold with a compressible liquid material, comprising:
a manifold;
a plurality of runners connecting the manifold to the mold;
at least one valve disposed in at least one of the plurality of runners; and
a controller configured to modulate the at least one valve over a first plurality of pulse cycles during one filling cycle of the mold, wherein
the at least one valve is in fluid communication with both the manifold and the mold,
a first pulse cycle of the first plurality of pulse cycles includes
moving a throttling member of the at least one valve from a first position to a second position, and
moving the throttling member of the at least one valve from the second position to a third position,
a flow aperture area of the at least one valve corresponding to the second position is larger than a flow aperture area of the at least one valve corresponding to the first position,
the flow aperture area of the at least one valve corresponding to the third position is smaller than the flow aperture area of the at least one valve corresponding to the second position,
the controller is configured to control the throttling member of the at least one valve to move from the first position to the second position when a measured dwell time in the first position is greater than or equal to a first target time, and when the measured dwell time in the first position is less than the first target time after a measured pressure of the compressible liquid material becomes greater than or equal to a first threshold pressure, and
the controller is configured to control the throttling member of the at least one valve to move from the second position to the third position when a measured dwell time in the second position is greater than or equal to a second target time, and when the measured dwell time in the second position is less than the second target time after the measured pressure of the compressible liquid material becomes less than or equal to a second threshold pressure.

27. The apparatus according to claim 26, wherein the mold includes a plurality of mold cavities, each of the plurality of mold cavities is connected to the manifold via one or more separate runners, the at least one valve is disposed in at least one of the one or more separate runners, such that the at least one valve is in fluid communication with both the manifold and a respective one of the plurality of mold cavities, and
the controller is configured to modulate the at least one valve over the first plurality of pulse cycles during one filling cycle of the mold, so that a viscosity of the compressible liquid material upstream of the at least one valve is reset to a value that is less strained than a value before valve modulation to uniformly fill the plurality of mold cavities.

28. An article of manufacture, comprising a non-transitory machine-readable medium having instructions encoded thereon for enabling a processor to fill a mold with a compressible liquid material by executing the operations of:
receiving at least one valve pulsing parameter defining a valve opening trigger,
receiving at least one valve pulsing parameter defining a valve closing trigger,
modulating at least one valve to perform a plurality of pulse cycles during one filling cycle of the mold, wherein
a first pulse cycle of the plurality of pulse cycles includes
moving a throttling member of the at least one valve from a first position to a second position, and
moving a throttling member of the at least one valve from the second position to a third position,
a flow aperture area of the at least one valve corresponding to the second position is larger than a flow aperture area of the at least one valve corresponding to the first position,
a flow aperture area of the at least one valve corresponding to the third position is smaller than the flow aperture area of the at least one valve corresponding to the second position,
the throttling member of the at least one valve is moved from the first position to the second position when a measured dwell time in the first position is greater than or equal to a first target time, and when the measured dwell time in the first position is less than the first target time after a measured pressure of the compressible liquid material becomes greater than or equal to a first threshold pressure, and the throttling member of the at least one valve is moved from the second position to the third position when a measured dwell time in the second position is greater than or equal to a second target time, and when the measured dwell time in the second position is less than the second target time after the measured pressure of the compressible liquid material becomes less than or equal to a second threshold pressure.

* * * * *